US010444864B2

(12) United States Patent
Ouyang et al.

(10) Patent No.: US 10,444,864 B2
(45) Date of Patent: Oct. 15, 2019

(54) MULTIFUNCTIONAL WIRELESS RING MOUSE WITH LASER POINTER FUNCTION

(71) Applicants: Chongqing Industry Polytechnic College, Chongqing (CN); Chongqing Zhire Technology Development Company, Chongqing (CN); Chongqing Ruihao Technology Development Company, Chongqing (CN)

(72) Inventors: Gang Ouyang, Chongqing (CN); Jingyun Ouyang, Chongqing (CN); Shu Su, Chongqing (CN)

(73) Assignees: Chongqing Industry Polytechnic College, Chongqing (CN); Chongqing Zhire Technology Development Company, Chongqing (CN); Chongqing Ruihao Technology Development Company, Chongqing (CN)

( * ) Notice: Subject to any disclaimer, the term of this patent is extended or adjusted under 35 U.S.C. 154(b) by 0 days.

(21) Appl. No.: 15/558,873

(22) PCT Filed: Aug. 31, 2016

(86) PCT No.: PCT/CN2016/097525
§ 371 (c)(1),
(2) Date: Sep. 15, 2017

(87) PCT Pub. No.: WO2017/201909
PCT Pub. Date: Nov. 30, 2017

(65) Prior Publication Data
US 2018/0188829 A1 Jul. 5, 2018

(30) Foreign Application Priority Data
May 22, 2016 (CN) .......................... 2016 1 0337691

(51) Int. Cl.
*G06F 3/0346* (2013.01)
*G06F 3/038* (2013.01)
(Continued)

(52) U.S. Cl.
CPC .......... *G06F 3/0346* (2013.01); *G06F 3/0317* (2013.01); *G06F 3/0383* (2013.01);
(Continued)

(58) Field of Classification Search
CPC .. G06F 3/033; G06F 3/03545; G06F 3/03549; G06F 3/0362; G06F 3/0346;
(Continued)

(56) References Cited

U.S. PATENT DOCUMENTS 5,940,066 A * 8/1999 Weinblatt ............ G06F 3/03545
345/179
2007/0152971 A1 * 7/2007 Chang ................... G06F 3/0317
345/166
(Continued)

FOREIGN PATENT DOCUMENTS

CN 2715234 Y 8/2005
CN 201548913 U 8/2010
(Continued)

OTHER PUBLICATIONS

Written Opinion for International Application No. PCT/CN2016/097525, dated Feb. 24, 2017 (9 pages).
(Continued)

*Primary Examiner* — Amit Chatly
*Assistant Examiner* — Nelson Lam
(74) *Attorney, Agent, or Firm* — Kagan Binder, PLLC

(57) ABSTRACT

A multifunctional wireless ring mouse with a laser pointer function includes a mouse body, an optical sensor cover, a rotating sleeve, a finger ring, a steel loop, a wheel, a laser emission port and an optical sensor, wherein a screw guide
(Continued)

hole, a charging socket and the laser emission port are arranged on an upper end of the mouse body, a power switch is arranged on a back side of the mouse body, the wheel, a selection button, a confirmation button, and a laser micro switch are arranged on a left side of the mouse body; a cylinder is arranged on a lower end of the mouse body; an outer groove is arranged outside the cylinder, an inner groove is arranged on an inner cylindrical wall of the cylinder, and a limit protruded ridge is arranged within the inner groove; a flange is arranged on the optical sensor cover, and limit ridge is arranged on the flange; a limit ring, a limit protruded ridge and a positioning screw are arranged on the rotating sleeve; a through groove is arranged on the finger ring, and the steel loop is arranged around the finger ring; and the optical sensor is fixed in the optical sensor cover. The wireless ring mouse of the present disclosure has multiple functions.

9 Claims, 3 Drawing Sheets

(51) Int. Cl.
  *G06F 3/03* (2006.01)
  *G06F 3/0354* (2013.01)
  *G02B 27/20* (2006.01)

(52) U.S. Cl.
  CPC .......... *G06F 3/03543* (2013.01); *G02B 27/20* (2013.01); *G06F 2203/0331* (2013.01)

(58) Field of Classification Search
  CPC ..... G06F 2203/0331; G06F 2203/0332; G06F 2203/0333; G06F 2203/0335; G06F 2203/0384
  USPC .................................................. 345/156–167
  See application file for complete search history.

(56) References Cited

U.S. PATENT DOCUMENTS

| | | | |
|---|---|---|---|
| 2009/0284470 A1* | 11/2009 | Liu | G06F 3/03543 345/163 |
| 2011/0043988 A1* | 2/2011 | Lin | G06F 3/03543 361/679.4 |
| 2011/0289966 A1* | 12/2011 | Ahrenholtz | A44C 9/02 63/15.6 |
| 2013/0027341 A1* | 1/2013 | Mastandrea | G06F 3/014 345/173 |
| 2014/0118253 A1* | 5/2014 | Jeong | G06F 3/03545 345/157 |
| 2016/0209920 A1* | 7/2016 | Mastandrea | G06F 3/014 |
| 2016/0353867 A1* | 12/2016 | Due | A45F 5/10 |
| 2017/0212588 A1* | 7/2017 | Kim | G06F 3/014 |
| 2019/0101982 A1* | 4/2019 | Tsuto | G06F 3/014 |

FOREIGN PATENT DOCUMENTS

| | | | |
|---|---|---|---|
| CN | 201576368 U | | 9/2010 |
| CN | 103257728 A | * | 8/2013 |
| CN | 203982314 U | | 12/2014 |
| CN | 104375675 A | | 2/2015 |
| CN | 204189138 U | | 3/2015 |
| CN | 204242112 U | | 4/2015 |
| CN | 105511652 A | * | 4/2016 |
| CN | 105759997 A | * | 7/2016 |
| CN | 106020475 A | * | 10/2016 |
| CN | 205910671 U | | 1/2017 |
| JP | 2001236177 A | | 8/2001 |

OTHER PUBLICATIONS

First Office Action for Chinese Counterpart Patent Application No. 201610337691.3, dated Apr. 2, 2018, including brief translation of the objections (4 pages).
First Search Report of Chinese Counterpart CN201610337691.3 (1 page).

* cited by examiner

MULTIFUNCTIONAL WIRELESS RING MOUSE WITH LASER POINTER FUNCTION

FIELD

The present disclosure relates generally to computer input devices, and more particularly, to a multifunctional wireless ring mouse with a laser pointer function.

BACKGROUND

There is no ring mouse suitable for right- or left-handedness and capable of being used both as a laser pointer and as a page turner.

SUMMARY

In order to overcome the defect in the prior art, the present disclosure provides a multifunctional wireless ring mouse with a laser pointer function.

The present disclosure provides the following technical solutions. A multifunctional wireless ring mouse with a laser pointer function is provided, including a mouse body, an optical sensor cover, a rotating sleeve, a finger ring, a steel loop, a wheel, a laser emission port and an optical sensor, wherein a screw guide hole, a charging socket and the laser emission port are arranged on an upper end of the mouse body, a power switch is arranged on a back side of the mouse body, the wheel, a selection button, a confirmation button, and a laser micro switch are arranged on a left side of the mouse body; a cylinder is arranged on a lower end of the mouse body; an outer groove is arranged outside the cylinder, an inner groove is arranged on an inner cylindrical wall of the cylinder, and a limit protruded ridge is arranged within the inner groove; a flange is arranged on the optical sensor cover, and limit ridge is arranged on the flange; a limit ring, a limit protruded ridge and a positioning screw are arranged on the rotating sleeve; a through groove is arranged on the finger ring, and the steel loop is arranged around the finger ring; the optical sensor is fixed in the optical sensor cover, and the flange and the limit ridge of the optical sensor cover are arranged in the inner groove and the limit protruded ridge; the rotating sleeve is arranged around the cylinder; and the finger ring is made of a TPU material.

The optical sensor cover is in clearance fit with the cylinder, when the positioning screw is not tightened; the optical sensor cover is rotatable in both left and right directions inside the cylinder, with a rotation angle limited within certain degrees, when the positioning screw is not tightened; and the rotating sleeve is in clearance fit with the cylinder, when the positioning screw is not tightened.

The finger ring is rotatable in a support.

The technical solution according to the present disclosure has the following advantageous effects.

a) The present disclosure fundamentally changes the way to manipulate the mouse, so that the user can adjust the angle to manipulate the mouse timely according to his/her own need. In the present disclosure, the optical sensor cover is rotatable to adapt various applications.

b) The present disclosure, as a mouse, can be both left-handed and right-handed.

c) The present disclosure has functions of both the laser pointer and the wireless page turner, with multiple purposes.

d) The present disclosure can effectively prevent illness, such as carpal tunnel syndrome.

DESCRIPTION OF REFERENCE SIGNS

10—mouse body; 11—screw guide hole; 12—a lower end of the mouse body; 13—cylinder; 14—outer groove; 15—inner cylindrical wall; 16—charging socket; 17—inner chamber; 18—inner groove; 19—limit protruded ridge; 20—optical sensor cover; 21—flange; 22—limit ridge; 30—rotating sleeve; 31—limit ring; 32—limit protruded ridge; 33—positioning screw; 34—support; 40—finger ring; 41—through groove; 50—steel loop; 60—wheel; 61—selection button; 62—confirmation button; 63—a bulge of the selection button; 64—a bulge of the confirmation button; 65—power switch; 70—laser emission port; 71—laser micro switch; and 80—optical sensor.

DETAILED DESCRIPTION

Figure 1:
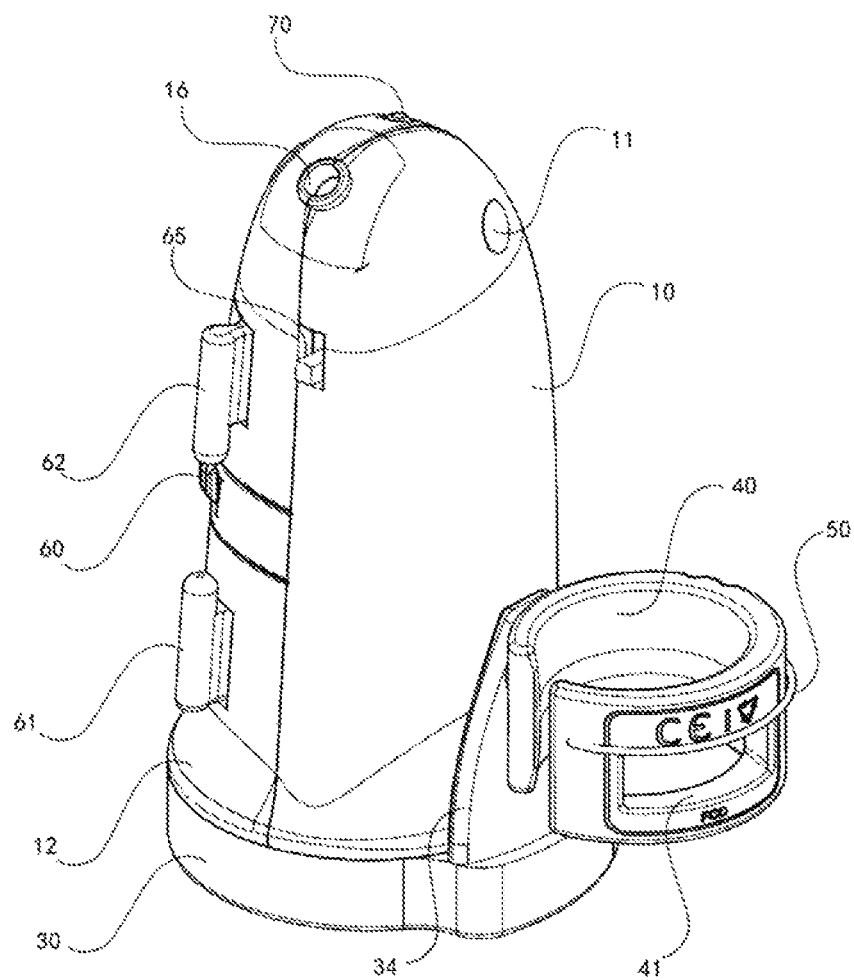
FIG. 1 is a space diagram (left-front view) illustrating a multifunctional wireless ring mouse with a laser pointer function according to one embodiment of the present disclosure.
Figure 2:
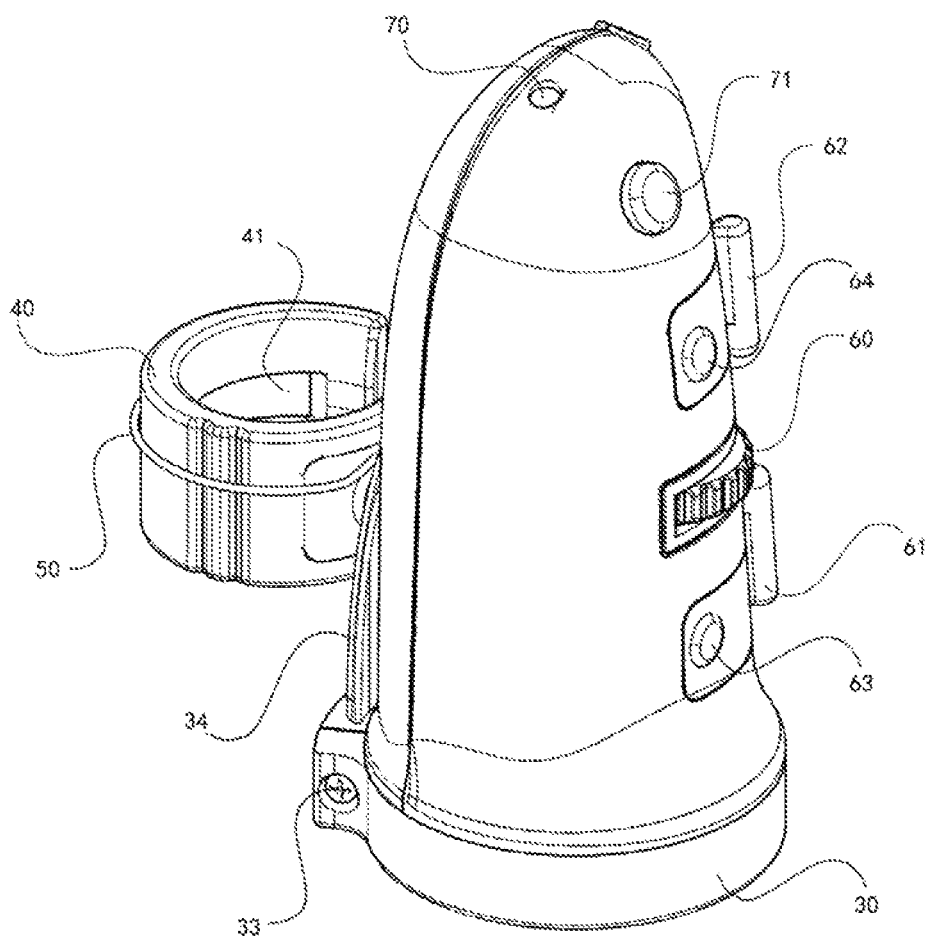
FIG. 2 is a space diagram (left-back view) of the multifunctional wireless ring mouse with the laser pointer function.
Figure 3:
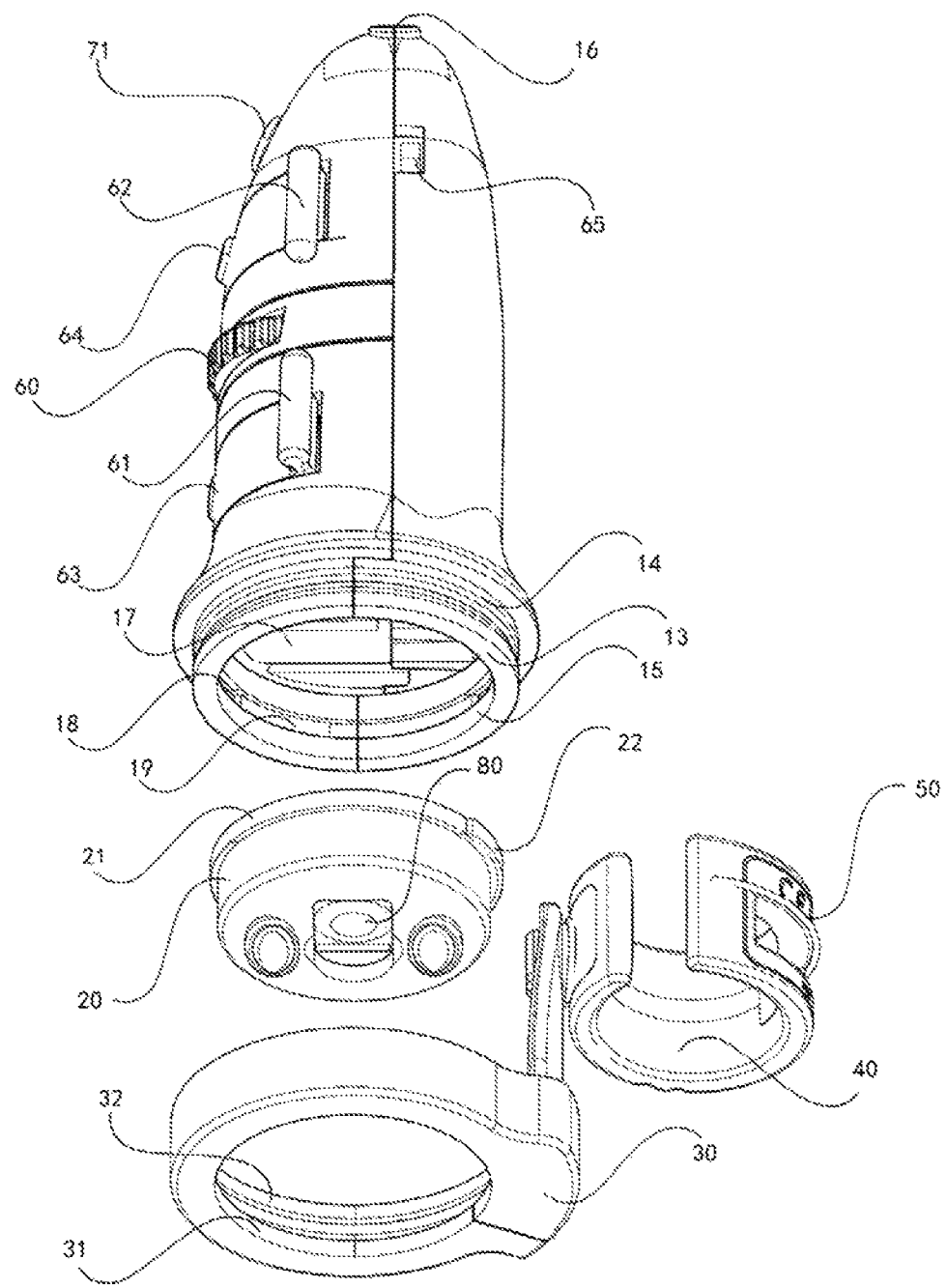
FIG. 3 is a structural schematic diagram (back-bottom view) of the multifunctional wireless ring mouse with the laser pointer function.

The disclosure may be best understood by reference to the following description taken in conjunction with the accompanying drawings. As shown in FIGS. 1-3, a multifunctional wireless ring mouse with a laser pointer function is provided, including a mouse body 10, an optical sensor cover 20, a rotating sleeve 30, a finger ring 40, a steel loop 50, a wheel 60, a laser emission port 70 and an optical sensor 80. A screw guide hole 11, a charging socket 16 and the laser emission port 70 are arranged on an upper end of the mouse body 10, a power switch 65 is arranged on a back side of the mouse body 10, the wheel 60, a selection button 61, a confirmation button 62, and a laser micro switch 71 are arranged on a left side of the mouse body 10. A cylinder 13 is arranged on a lower end 12 of the mouse body. An outer groove 14 is arranged outside the cylinder 13, an inner groove 18 is arranged on an inner cylindrical wall 15 of the cylinder 13, and a limit protruded ridge 19 is arranged within the inner groove 18. A flange 21 is arranged on the optical sensor cover 20, and limit ridge 22 is arranged on the flange 21. A limit ring 31, a limit protruded ridge 32 and a positioning screw 33 are arranged on the rotating sleeve 30. A through groove 41 is arranged on the finger ring 40, and the steel loop 50 is arranged around the finger ring 40. The optical sensor 80 is fixed in the optical sensor cover 20, and the flange 21 and the limit ridge 22 of the optical sensor cover 20 are arranged in the inner groove 18 and the limit protruded ridge 19. The rotating sleeve 30 is arranged around the cylinder 13. The finger ring 40 is made of a TPU material.

The optical sensor cover 20 is in clearance fit with the cylinder 13, when the positioning screw 33 is not tightened; the optical sensor cover 20 is rotatable in both left and right directions inside the cylinder 13, with a rotation angle limited within 300 degrees, when the positioning screw 33 is not tightened; and the rotating sleeve 30 is in clearance fit with the cylinder 13, when the positioning screw 33 is not tightened.

The finger ring 40 is rotatable in a support 34.

In this embodiment, the selection button 61 is equivalent to a left button of a traditional mouse, the confirmation is equivalent to a right button of the traditional mouse. A micro switch is mounted under the wheel 60, and the micro switch may be activated by pressing the wheel 60.

The optical sensor 80 is connected to a circuit board inside the mouse through a soft wire, to facilitate the rotation of the optical sensor cover 20.

The present disclosure fundamentally changes the way to manipulate the mouse, and implement a both left-handed and right-handed mouse.

The present disclosure has functions of both the laser pointer and the wireless page turner, with multiple purposes.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure.

What is claimed is:

1. A multifunctional wireless ring mouse with a laser pointer function, comprising a mouse body (10), an optical sensor cover (20), a rotating sleeve (30), a finger ring (40), a steel loop (50), a wheel (60), a laser emission port (70) and an optical sensor (80), wherein a screw guide hole (11), a charging socket (16) and the laser emission port (70) are arranged on an upper end of the mouse body (10), a power switch (65) is arranged on a back side of the mouse body (10), the wheel (60), a selection button (61), a confirmation button (62), and a laser micro switch (71) are arranged on a left side of the mouse body (10);

a cylinder (13) is arranged on a lower end (12) of the mouse body;

an outer groove (14) is arranged outside the cylinder (13), an inner groove (18) is arranged on an inner cylindrical wall (15) of the cylinder (13), and a limit protruded ridge (19) is arranged within the inner groove (18);

a flange (21) is arranged on the optical sensor cover (20), and limit ridge (22) is arranged on the flange (21);

a limit ring (31), a limit protruded ridge (32) and a positioning screw (33) are arranged on the rotating sleeve (30);

a through groove (41) is arranged on the finger ring (40), and the steel loop (50) is arranged around the finger ring (40);

the finger ring (40) is physically coupled to the rotating sleeve (30);

the optical sensor (80) is fixed in the optical sensor cover (20), and the flange (21) and the limit ridge (22) of the optical sensor cover (20) are arranged in the inner groove (18) and the limit protruded ridge (19); and the rotating sleeve (30) is arranged around the cylinder (13) and is rotatable with respect to the mouse body (10) when the positioning screw (33) is not tightened.

2. The multifunctional wireless ring mouse with the laser pointer function of claim 1, wherein the finger ring (40) is made of a TPU material.

3. The multifunctional wireless ring mouse with the laser pointer function of claim 1, wherein the optical sensor cover (20) is in clearance fit with the cylinder (13), when the positioning screw (33) is not tightened.

4. The multifunctional wireless ring mouse with the laser pointer function of claim 3, wherein the optical sensor cover (20) is rotatable in both left and right directions inside the cylinder (13), with a rotation angle limited within 300 degrees, when the positioning screw (33) is not tightened.

5. The multifunctional wireless ring mouse with the laser pointer function of claim 3, wherein the rotating sleeve (30) is in clearance fit with the cylinder (13), when the positioning screw (33) is not tightened.

6. The multifunctional wireless ring mouse with the laser pointer function of claim 1, wherein the finger ring (40) is physically coupled to the rotating sleeve (30) by a support (34) and the finger ring (40) is rotatable in the support (34).

7. The multifunctional wireless ring mouse with the laser pointer function of claim 1, wherein a micro switch is mounted under the wheel (60), and the micro switch is adapted to be activated by pressing the wheel (60).

8. The multifunctional wireless ring mouse with the laser pointer function of claim 1, wherein the laser micro switch (71) is adapted to control laser emission.

9. The multifunctional wireless ring mouse with the laser pointer function of claim 1, wherein the optical sensor (80) is connected to a circuit board inside the multifunctional wireless ring mouse through a soft wire.

* * * * *